US012731402B2

(12) United States Patent
Malalur et al.

(10) Patent No.: US 12,731,402 B2
(45) Date of Patent: Sep. 8, 2026

(54) AUTOMATING VEHICLE DAMAGE INSPECTION USING CLAIMS PHOTOS

(71) Applicant: Cambridge Mobile Telematics Inc., Cambridge, MA (US)

(72) Inventors: Paresh Malalur, Cambridge, MA (US); Sandeep Badrinath, Cambridge, MA (US); Onkar Trivedi, Cambridge, MA (US); Dheeptha Badrinarayanan, Cambridge, MA (US)

(73) Assignee: Cambridge Mobile Telematics Inc., Cambridge, MA (US)

( * ) Notice: Subject to any disclaimer, the term of this patent is extended or adjusted under 35 U.S.C. 154(b) by 72 days.

(21) Appl. No.: 18/767,201

(22) Filed: Jul. 9, 2024

(65) Prior Publication Data

US 2025/0022274 A1 Jan. 16, 2025

Related U.S. Application Data

(60) Provisional application No. 63/525,824, filed on Jul. 10, 2023.

(51) Int. Cl.
*G06V 20/50* (2022.01)
*G06T 3/18* (2024.01)
(Continued)

(52) U.S. Cl.
CPC ................ *G06V 20/50* (2022.01); *G06T 3/18* (2024.01); *G06T 15/06* (2013.01); *G06T 15/10* (2013.01);
(Continued)

(58) Field of Classification Search
None
See application file for complete search history.

(56) References Cited

U.S. PATENT DOCUMENTS 10,373,260 B1 * 8/2019 Haller, Jr. .............. G06Q 40/08
2018/0260793 A1 * 9/2018 Li .......................... G06Q 10/20
(Continued)

FOREIGN PATENT DOCUMENTS

EP 3744601 B1 4/2024
EP 3507787 B1 8/2024
(Continued)

OTHER PUBLICATIONS

Extended European Search Report in European Appln. No. 24187680. 4, mailed on Oct. 16, 2024, 7 pages.
(Continued)

*Primary Examiner* — David H Chu
(74) *Attorney, Agent, or Firm* — Kilpatrick Townsend & Townsend LLP

(57) ABSTRACT

In an implementation, a set of images of a vehicle, is captured as a captured set of images, where the set of images are captured from different viewpoints around the vehicle. The captured set of images are organized. The captured set of images are mapped, as a mapped image set, using an image classification model. The mapped image is aligned, as an aligned image set, onto a three-dimensional vehicle model for the vehicle. Image-level damage detection is performed on each image in the aligned image set to estimate a damage probability for each pixel in each image. Part damage and severity is predicted for each image.

20 Claims, 11 Drawing Sheets

(51) Int. Cl.

| | |
|---|---|
| ***G06T 15/06*** | (2011.01) |
| ***G06T 15/10*** | (2011.01) |
| ***G06T 17/00*** | (2006.01) |
| ***G06V 10/24*** | (2022.01) |
| ***G06V 10/74*** | (2022.01) |
| ***G06V 10/764*** | (2022.01) |
| ***G06V 10/774*** | (2022.01) |
| ***G06V 10/82*** | (2022.01) |
| ***G06V 20/64*** | (2022.01) |
| ***G06V 20/70*** | (2022.01) |

(52) U.S. Cl.

CPC .............. *G06T 17/00* (2013.01); *G06V 10/24* (2022.01); *G06V 10/761* (2022.01); *G06V 10/764* (2022.01); *G06V 10/774* (2022.01); *G06V 10/82* (2022.01); *G06V 20/64* (2022.01); *G06V 20/70* (2022.01); *G06T 2200/08* (2013.01)

(56) References Cited

U.S. PATENT DOCUMENTS

| | | | | |
|---|---|---|---|---|
| 2020/0234488 | A1* | 7/2020 | Holzer | H04N 23/633 |
| 2020/0349370 | A1* | 11/2020 | Lambert | G06V 20/20 |
| 2021/0201337 | A1* | 7/2021 | Chow | G06Q 30/0203 |
| 2021/0279943 | A1* | 9/2021 | Murez | G06N 3/0464 |
| 2022/0138860 | A1* | 5/2022 | Chatfield | G06V 20/56 705/4 |
| 2022/0358634 | A1 | 11/2022 | Penny et al. | |
| 2023/0153975 | A1* | 5/2023 | Lutich | G06N 3/0464 382/141 |
| 2023/0222179 | A1* | 7/2023 | Yang | G06Q 40/08 382/157 |
| 2024/0394861 | A1* | 11/2024 | Ho | G06V 10/764 |

FOREIGN PATENT DOCUMENTS

| | | |
|---|---|---|
| EP | 4005252 B1 | 1/2025 |
| EP | 3588373 B1 | 6/2025 |

OTHER PUBLICATIONS

Malalur et al., “Alignment Based Matching Networks for One-Shot Classification and Open-Set Recognition,” CoRR, Submitted on Mar. 2019, arXiv:1903.06538vx1, 12 pages.

Nguyen-Phuoc et al., “RenderNet: A deep convolutional network for differentiable rendering from 3D shapes,” Presented at the Proceedings of the 32rd International Conference on Neural Information Processing Systems, Montreal, Canada, Dec. 3-8, 2018, 11 pages.

EP24187680.4, “Office Action”, Feb. 17, 2026, 5 pages.

* cited by examiner

600

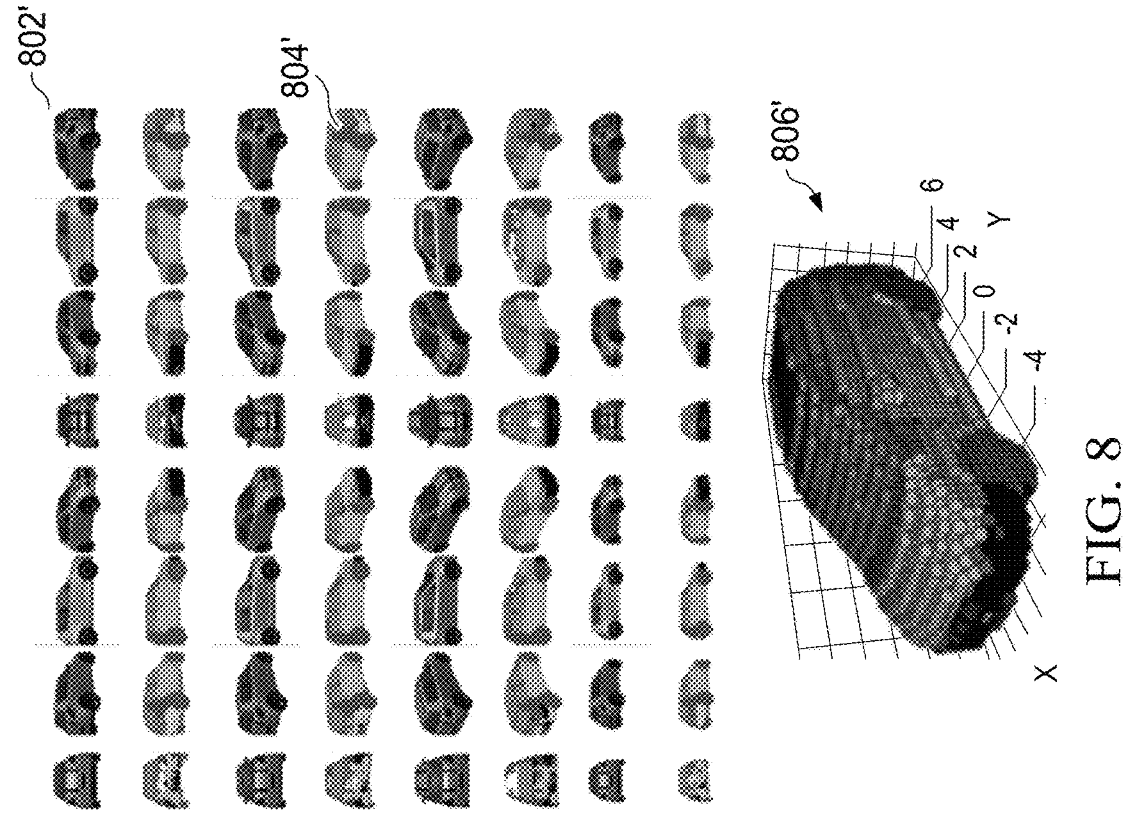
FIG. 8
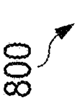
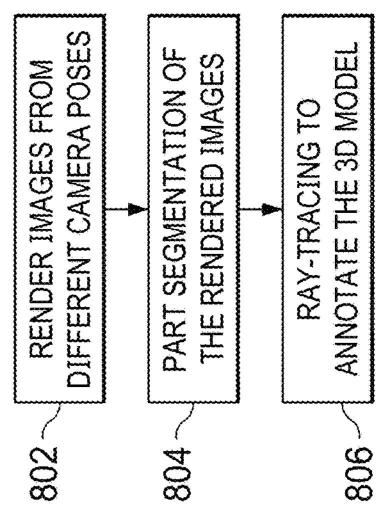

| | FRONT BUMPER | FRONT FENDER | FRONT DOOR | FRONT LAMP | REAR DOOR | REAR LAMP | REAR BUMPER |
|---|---|---|---|---|---|---|---|
| DAMAGED? | ✓ | ✓ | ✗ | ✓ | ✗ | ✗ | ✗ |

AUTOMATING VEHICLE DAMAGE INSPECTION USING CLAIMS PHOTOS

CROSS REFERENCE TO RELATED APPLICATION

This application claims the benefit under 35 U.S.C. § 119 (e) of U.S. Application No. 63/525,824, titled "AUTOMATING VEHICLE DAMAGE INSPECTION USING CLAIMS PHOTOS," filed Jul. 10, 2023, the entire contents of which are incorporated herein by reference.

BACKGROUND

Traditional processing of vehicle insurance damage claims is highly inefficient. For example, after an accident, depending on an insurer and severity of the accident, a vehicle either needs an in-person inspection or a customer sends photos of the damaged vehicle to the insurer, where the photos are manually analyzed to detect damage. As the damage inspection process is largely manual, it is time-consuming, and the insurer bears a significant cost in both time and employee resources. Long claims processing time also leads to customer dissatisfaction.

SUMMARY

The present disclosure describes automating vehicle damage inspection using claims photos.

In an implementation, a computer-implemented method, comprises: capturing, as a captured set of images, a set of images of a vehicle, wherein the set of images are captured from different viewpoints around the vehicle; organizing the captured set of images; mapping, as a mapped image set, the captured set of images using an image classification model; aligning, as an aligned image set, the mapped image set onto a three-dimensional vehicle model for the vehicle; performing image-level damage detection on each image in the aligned image set to estimate a damage probability for each pixel in each image; and predicting part damage and severity for each image.

The described subject matter can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented to realize one or more of the following advantages. First, a traditionally manual vehicle damage inspection process can be automated using user-taken photos of a damaged vehicle after an accident. Second, obtaining the photos does not require special photographic equipment and can be obtained from a user's mobile device. The photos are automatically analyzed to detect damage through a model that relies on computer vision and machine learning. Third, a mobile application can provide guidance to the user to take photos from standard viewpoints (for example, using a wireframe of a vehicle as a reference). Fourth, using the described approach, claims processing time can be greatly reduced and lower costs for vehicle damage analysis, benefiting both insurers and end consumers. Fifth, the described approach is better suited to handle vehicle damage analysis for increasingly complex vehicle parts. Sixth, the described approach can provide a three-dimensional (3D) view of vehicle damage severity in contrast to conventional two-dimensional (2D) approaches at an image level. A 3D view of damages can be helpful for a variety of reasons, including: 1) enabling augmentation of vehicle telematics data to improve damage detection; 2) helping to determine fault or liability in an accident; and 3) enabling simple damage verification if needed; and 4) by pinning photos (and hence damage) to a 3D model, additional information can be extracted from the 3D model (for example, parts and components). Seventh, a unique aspect of the described approach is that it does not require image-level damage annotations to train models. Eighth, another unique aspect of the approach is that one can also incorporate zoomed-in images (that is, close-up images of damaged regions of a part), which can be otherwise difficult to incorporate because of the challenging nature of relating which part a close up image is associated with.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

FIG. 8 illustrates a method for part annotation for a 3D vehicle model, according to an implementation of the present disclosure.

Like reference numbers and designations in the various drawings indicate like elements.

DETAILED DESCRIPTION

Figure 1:
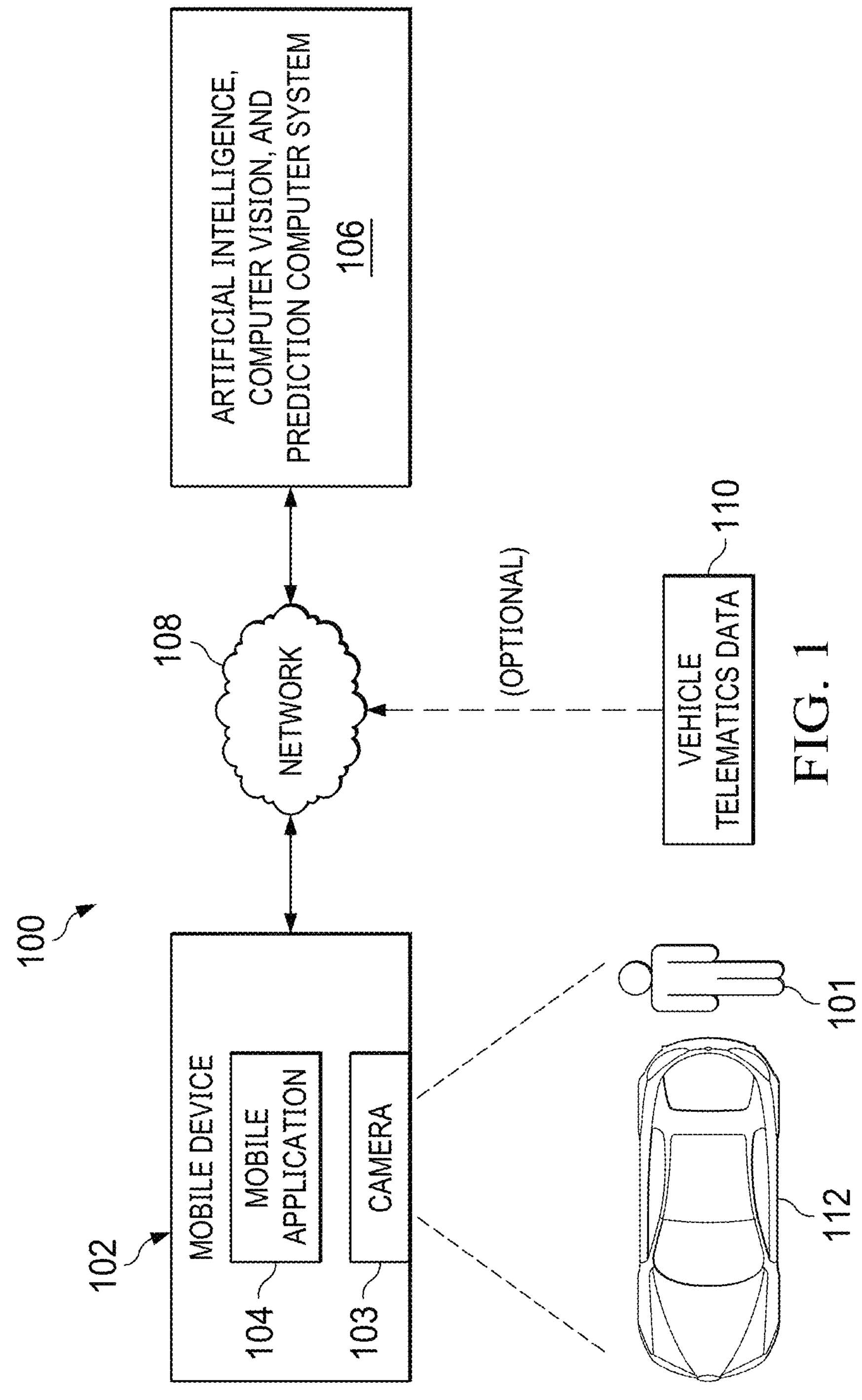
FIG. 1 is a block diagram illustrating a high-level example of a computer system for automating vehicle damage inspection using claims photos, according to an implementation of the present disclosure.

The following detailed description describes automating vehicle damage inspection using claims photos, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

Traditional processing of vehicle insurance damage claims is highly inefficient. For example, after an accident, depending on an insurer and severity of the accident, a vehicle either needs an in-person inspection or a customer sends photos of the damaged vehicle to the insurer, where the photos are manually analyzed to detect damage. As the damage inspection process is largely manual, it is time-consuming, and the insurer bears a significant cost in both time and employee resources. Long claims processing time also leads to customer dissatisfaction. The subject matter described in this specification can be implemented to automate traditionally manual vehicle damage inspection processes.

At a high-level, photos of a damaged vehicle are taken by a user after an accident. Obtaining the photos does not require special photographic equipment, and the photos can be obtained from a user's mobile device (for example, a cellular telephone). A mobile application can provide guidance to the user to take photos from standard viewpoints (for example, using a wireframe of a vehicle as a reference). The photos are automatically analyzed to detect damage through a model that relies on computer vision and machine learning.

Using the described approach, claims processing time can be greatly reduced and lower costs for vehicle damage analysis, benefiting both insurers and end consumers. The described approach is also better suited to handle vehicle damage analysis for increasingly complex vehicle parts. For example, the described approach can provide a three-dimensional (3D) view of vehicle damage severity in contrast to conventional two-dimensional (2D) approaches at an image level. A 3D view of damages can be helpful for a variety of reasons, including: 1) enabling augmentation of vehicle telematics data (for example, vehicle onboard sensors, such as inertial and Global Positioning System (GPS) sensors and dashcam footage) to improve damage detection; 2) helping to determine fault or liability in an accident; and 3) enabling simple damage verification if needed. The described approach also does not require image-level damage annotations to train models.

FIG. 1 is a block diagram illustrating a high-level example of a computer system 100 for automating vehicle damage inspection using claims photos, according to an implementation of the present disclosure. The computer system 100 includes a mobile device 102 with associated camera 103 and mobile application 104; AI, computer vision, and prediction computer system (prediction system) 106, network 108, and (optional) vehicle telematics data 110 associated with a vehicle 112.

In some implementations, mobile device 102 can include a cellular telephone, laptop computer, tablet computer, or other mobile computing device. The mobile device 102 is connectable to a network 108 (for example, a cellular or Wi-Fi network) for transmitting voice and other data across cellular and Internet networks. In some implementations, the mobile device 102 can be configured with light detection and ranging (LIDAR) or other sensors (not illustrated) which can be leveraged by the mobile application 104 to increase precision and enhance data collection.

Camera 103 can include cameras built-in to the mobile device 102 or externally attachable to mobile device 102. In some implementations, camera 103 is configured to take both video and still photographic images. In some implementations, camera 103 is configured to take macro (close-up) photographic images. In some implementations, the LIDAR or other sensors can work in conjunction with the camera 103 to collect additional data (for example, precise distance measurements, contour data, and other data).

An important piece in the proposed approach is image alignment that allows alignment of images to a vehicle 3D model. Quality of acquired images (such as, in terms of orientation of the camera or closeness of the camera to the vehicle) plays a significant role in quality of image alignment, thereby impacting damage detection results. In some implementations, among other things, mobile application 104 can display a graphical user interface (GUI) providing guidance to a user (for example user 101 in FIG. 1) to take photos from standard viewpoints (for example, using a wireframe of an indicated vehicle as a reference) around the vehicle. The provided guidance can help ensure that the user collects necessary data to permit automated vehicle damage inspection using claims photos. In some implementations, the mobile application 104 can automatically reject photos that do not satisfy image requirements (for example, resolution, lighting, zoom, and position) and prompt the user to retake the photos.

In some implementations, the mobile application 104 can prompt the user for additional information related to a vehicle accident (for example, names, addresses, locations, time/date, weather conditions, and user statements). In some implementations, the mobile device can prompt the user to collect additional data using one or more additional sensors that may be present on the mobile device 102 (for example, the previously mentioned LIDAR, accelerometer, gyroscope, or other embedded or attached sensors). Data from the other sensors can be used to provide additional guidance to the user as well as to enable more accurate image alignment to the vehicle 3D model.

In some implementations, the described approach is not restricted to photographs and can be extended to manage video, which is essentially a sequence of photographs. In the case of video data, the mobile application 104 could prompt the user to consider a walkthrough video around the damaged vehicle instead of, or in addition to, taking photos. In some cases, video acquisition can provide a more detail view of a vehicle and potentially offer a better user experience.

Collected data is transmitted from the mobile device 102 to the prediction system 106 using network 108. The collected data is automatically analyzed to detect damage through an AI/ML model that relies on computer vision and machine learning.

In some implementations, vehicle telematics data 110 (if available) can be collected by the mobile device using network 108 and used to improve damage detection. In some implementations, the claim photos can be augmented with the vehicle telematics data 110 to improve the damage detection. For example, dashcam data can be used to corroborate damage to a host vehicle and/or a vehicle that was hit by the host vehicle. Inertial sensor data can be used to help determine with how much force a host vehicle hit another vehicle. GPS sensors can be used to corroborate geographic position of a host vehicle and to provide an estimate of host vehicle velocity at a time of impact. In some cases, the vehicle telematics data 110 can be used to infer a vehicle's trajectory, which can provide additional insights, such as impact direction and severity of impact. The determined/inferred data can be included as additional features in a damage detection AI/ML model and be used to narrow down which parts are likely to be damaged, and estimate the likelihood of any vehicle internal damages, which might not be apparent from the claim photos.

The described approach is focused on developing one or more algorithms to automatically detect which vehicle part is damaged and, given a set of photos of the damaged vehicle from different viewpoints, the extent of damage. In general, automatic damage detection from photos can be challenging for various reasons, including: 1) an unknown camera pose/obscure camera viewpoints of captured photos; 2) irrelevant photos (such as, the interior of a vehicle); 3) minor damage that is only visible in close-up photos; 4) variety of car models; and 5) weak ground truth data with respect to artificial intelligence (AI)/machine learning (ML) (that is, claim-level information that contains information of which parts are damaged for a given set of images used to develop an AI/ML model).

The proposed algorithm takes a set of claims photos as inputs and outputs a damage probability across an entire surface of a 3D car model. The proposed algorithm further predicts which car part is damaged.

At a high-level, the proposed approach for damage detection involves: 1) each image is aligned over a surface of a 3D car model; 2) damage probability is estimated at a pixel-level for each image, which is then used to estimate the damage probability over the surface of the car using the image-3D model alignment; and 3) the part damage is inferred using the estimated 3D damage probability and the part annotations of the 3D model.

Figure 2:
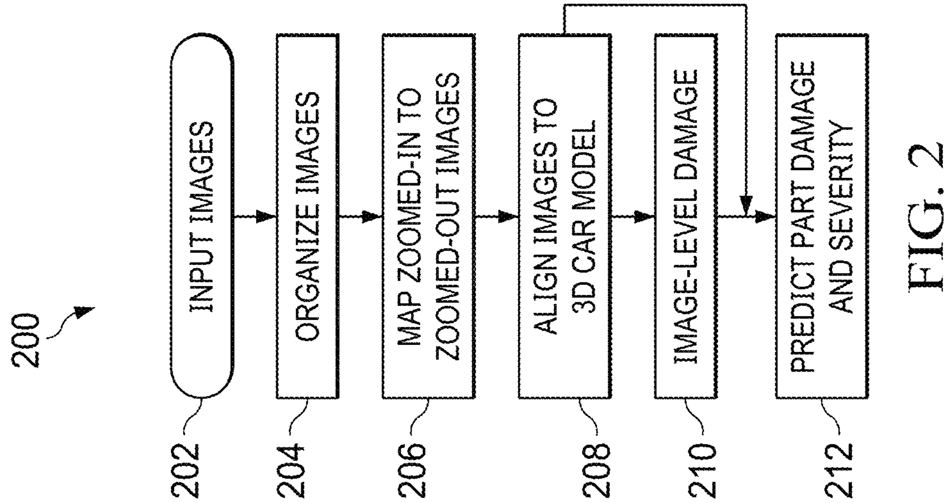
FIG. 2 is a flow chart illustrating an example of a method for automating vehicle damage inspection using claims photos, according to an implementation of the present disclosure.

FIG. 2 is a flow chart illustrating an example of a method 200 for automating vehicle damage inspection using claims photos, according to an implementation of the present disclosure. For clarity of presentation, the description that follows generally describes method 200 in the context of the other figures in this description. However, it will be understood that method 200 can be performed, for example, by any system, environment, software, and hardware, or a combination of systems, environments, software, and hardware, as appropriate. In some implementations, various steps of method 200 can be run in parallel, in combination, in loops, or in any order.

At 202, a set of images (for example, 2D photos) of a vehicle are captured from different viewpoints around the vehicle. For example, the previously described mobile device 102, camera 103, and mobile application 104 of FIG. 1 can be used to capture the set of images.

Figure 3:
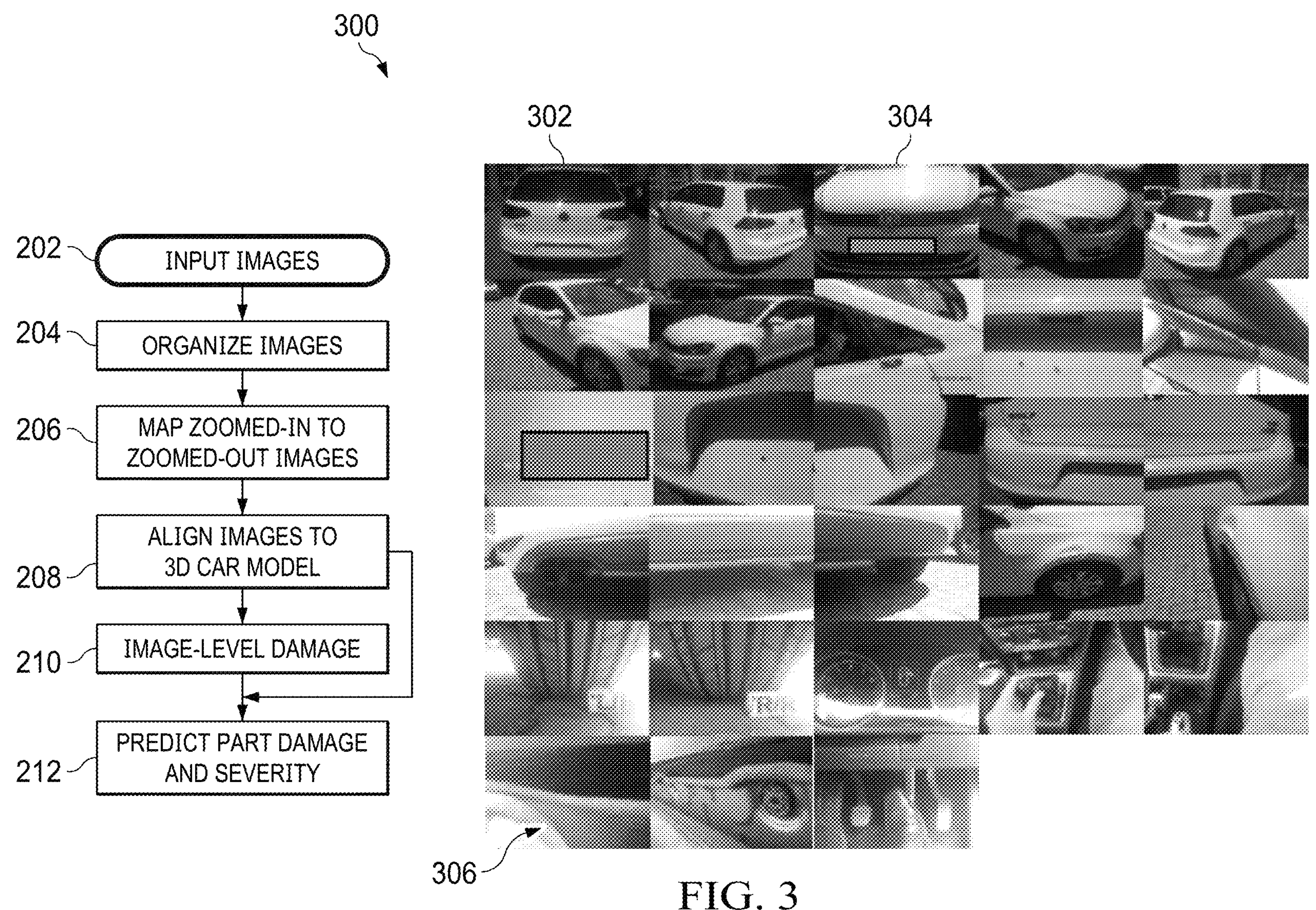
FIG. 3 illustrates a captured set of images of a vehicle, according to an implementation of the present disclosure.

Referring to FIG. 3, FIG. 3 illustrates a captured set of images 300 of a vehicle, according to an implementation of the present disclosure. The set of images 300 are taken from different viewpoints around the vehicle and can include close-up images. For example, in the set of images 300, images 302, 304, and 306 are back, front, and close-up images, respectively.

Returning to FIG. 2, from 202, method 200 proceeds to 204.

At 204, the captured set of images 300 is organized into three categories: 1) Zoomed-out; 2) Zoomed-in; and 3) Other using a custom deep-learning image classification AI/ML model.

Figure 4:
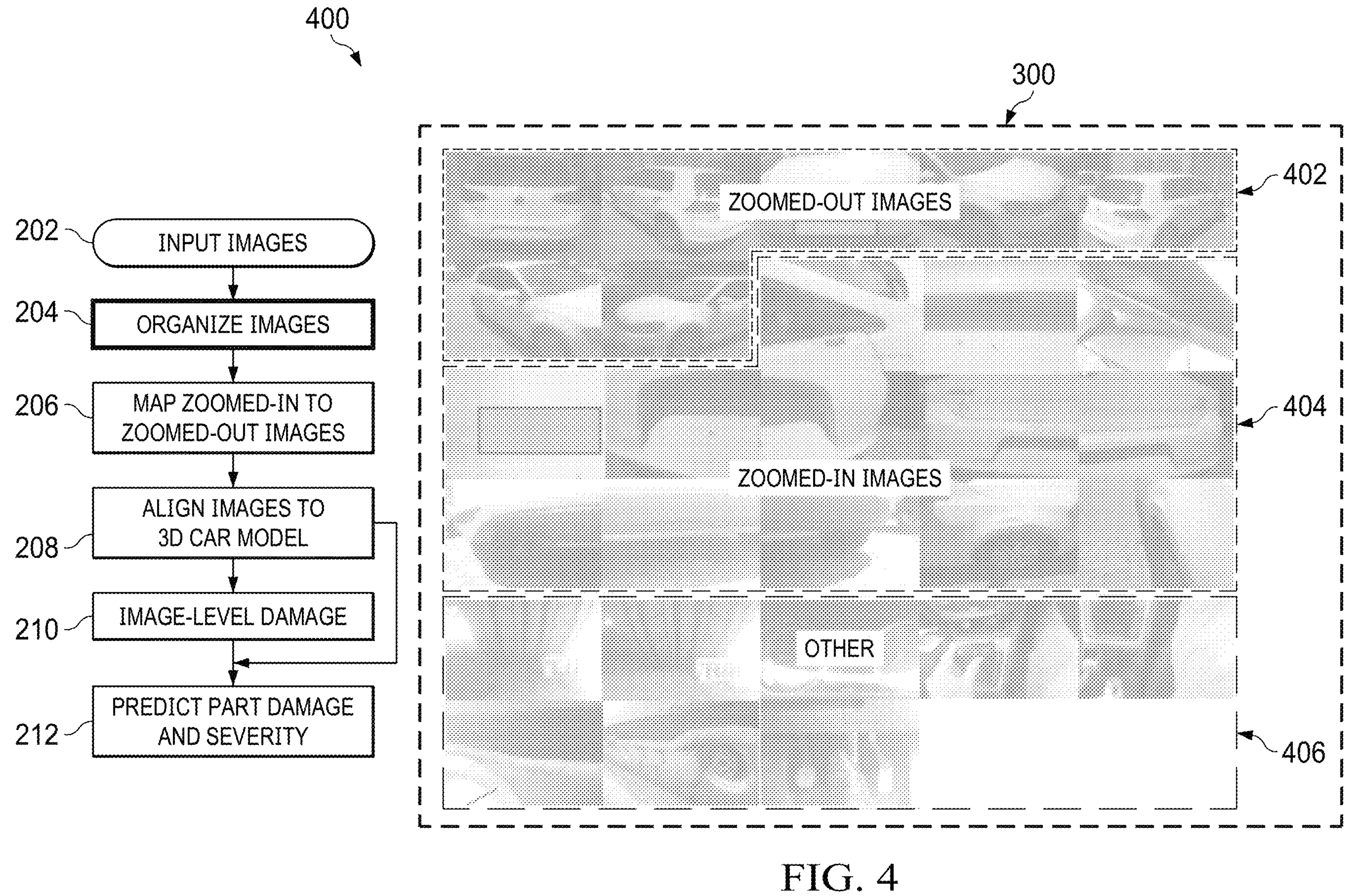
FIG. 4 illustrates an organized captured set of images, according to an implementation of the present disclosure.

Referring to FIG. 4, FIG. 4 illustrates an organized captured set of images 300, according to an implementation of the present disclosure. In some implementations, each image of images 300 is automatically categorized into one of three categories: 1) Zoomed-out; 2) Zoomed-in; and 3) Other.

Zoomed-out images (for example, 402) refers to images that have a complete (or partially complete) view of a vehicle. Zoomed-in images (for example, 404) refers to those images that have a close-up view of the vehicle. Other images (for example, 406) are determined to be irrelevant for damage detection (such as, the interior of the car).

In some implementations, the categorization of the images 300 into the three categories is performed using a custom image classification model. As Other images 406 are considered irrelevant, the explanation of the described approach will consider only Zoomed-out 402 and Zoomed-in images 406 for damage detection.

Returning to FIG. 2, from 204, method 200 proceeds to 206.

At 206, the Zoomed-in images 404 are mapped to Zoomed-out images 402.

Figure 5:
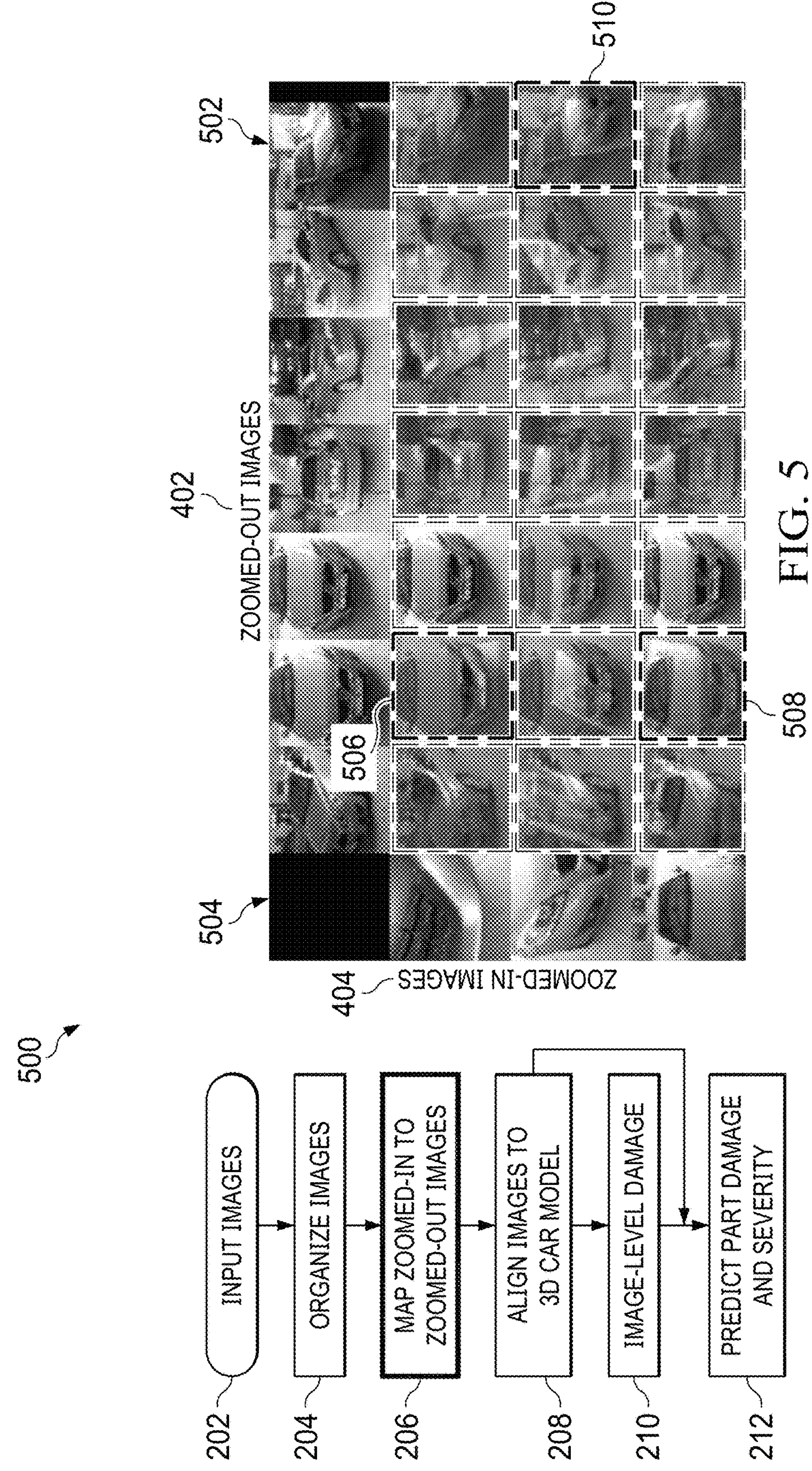
FIG. 5 illustrates a mapped image set of Zoomed-in images mapped to Zoomed-out images, according to an image of the present disclosure.

Referring to FIG. 5, FIG. 5 illustrates a mapped image set 500 of Zoomed-in images 404 mapped to Zoomed-out images 402, according to an image of the present disclosure. In some implementations, for each Zoomed-in image 404, the best matching Zoomed-out image 402 is determined, as well as an optimal image warping transformation to map pixels in the Zoomed-in image 404 to the pixels in the Zoomed-out image 402. For example, in some implementations, a homography transformation can be used. As another example, in some implementations, a piecewise homography transform can be used. Other image warping transformation techniques consistent with the described approach as would be understood by one of ordinary skill in art are also considered to be within the scope of this disclosure.

The primary reason to perform such a mapping is to align the Zoomed-in images 404 to a 3D vehicle model corresponding to the damaged vehicle using the Zoomed-out images 402. It is relatively easier to align the Zoomed-out images 402 to the 3D vehicle model given that Zoomed-out images 402 have a complete view of the vehicle.

In FIG. 5, the top row 502 is populated with Zoomed-out images 402, and the first column 504 is a set of Zoomed-in images 404. The images in the remainder of the mapped image set 500 correspond to a corresponding warped Zoomed-in image 404 overlaid on a corresponding Zoomed-out image 402 after determining the optimal image warping transformation for each pair. The indicated example boxed images (506, 508, and 510) represent the best matching pair of Zoomed-in image 404 to Zoomed-out image 402.

In some implementations, for each pair of the Zoomed-in image 402 and Zoomed-out image 404, mapping is performed by: 1) a high-dimensional pixel embedding is determined such that the matching pixels in the Zoomed-in image 404 and Zoomed-out image 402 have a high cosine similarity in the embedding space; 2) the pixel embedding is used to find the pixel correspondences between the Zoomed-in image 402 and the Zoomed-out image 404; and 3) an optimal image warping transformation is determined using the pixel correspondences to warp the Zoomed-in image 402 onto the Zoomed-out image 404. For each Zoomed-in image 402, the optimal image warping transformation is determined with every other Zoomed-out image 404. The best matching Zoomed-out image 402 for each Zoomed-in image 404 is determined, such that the optimal image warping transformation yields the greatest number of inliers with regard to the pixel correspondences.

Stated in greater detail, in some implementations, given noisy pixel correspondences between the Zoomed-in image 404 pixels (x_i, y_i) and Zoomed-out image 402 pixels (u_i, v_i), we find an optimal image warping transformation (H) is found that determines the mapping of the Zoomed-in image 404 pixels to Zoomed-out image 402 pixels. That is, s [u, v, 1]=H [x, y, 1], where s is a scaling factor. Once the optimal image warping transformation (H) is found, a warped Zoomed-in image 404 overlaid on the Zoomed-out image 402 can be obtained by applying the optimal image warping transformation for all the pixels of the Zoomed-in image 404.

Out of all the potential pairs of Zoomed-in image 404 and Zoomed-out image 402 matchings, a pair that provides the greatest number of inliers is selected (here, a particular Zoomed-in image 404 pixel is considered a inlier if a position error between the transformed Zoomed-in image 404 pixel in the Zoomed-out image 402 coordinates and the corresponding Zoomed-out image 402 pixel's position is less than a particular threshold. In some implementations, the overlaid image with the greatest number of inliers (that is, a best match) can be highlighted with a unique border (for example, color, pattern, or intensity).

Figure 6:
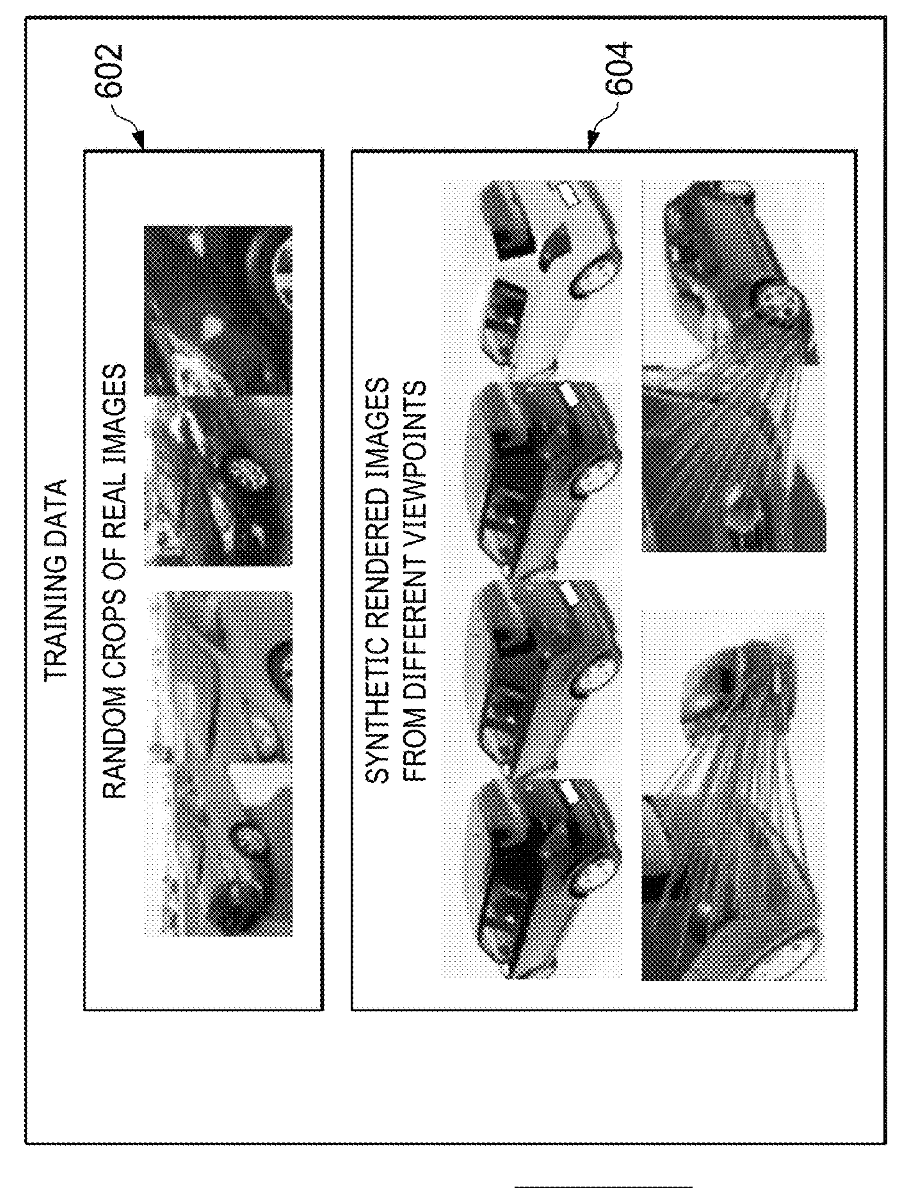
FIG. 6 illustrates training data for training a machine-learning model to learn pixel embedding, pixel matching based on a similarity metric, and image alignment based on an optimal image warp transformation, according to an implementation of the present disclosure.

Referring to FIG. 6, FIG. 6 illustrates training data 600 for training a machine-learning model to learn pixel embedding, pixel matching based on a similarity metric, and image alignment based on an optimal image warping transformation, according to an implementation of the present disclosure.

For example, in some implementations, training data 600 includes both random crops of real images of vehicles 602 and synthetic rendered images from different viewpoints 604. In some implementations, the trained machine-learning model is used for mapping an image set of Zoomed-in images 404 to Zoomed-out images 402 and aligning the Zoomed-out images 402 to a 3D vehicle model.

In some implementations, for real images of vehicles 602 (for example, in the top row of FIG. 6), the image is considered, then compute a random crop of the image, so that a ground truth mapping is obtained between pixels of the original real image and the cropped version of the image.

For synthetic images, a 3D model of the car of interest is rendered from different known camera viewpoints. Given the camera viewpoint of image pairs, a ground truth mapping between corresponding pixels for the image-pairs can be found.

With a ground truth correspondence for the real and synthetic image pairs, an AI/ML model can be trained for pixel matching. In some implementations, this can be accomplished by learning a high-dimensional embedding for each pixel.

Returning to FIG. 2, from 206, method 200 proceeds to 208.

At 208, the mapped image set 500 is aligned onto the 3D vehicle model.

Figure 7:
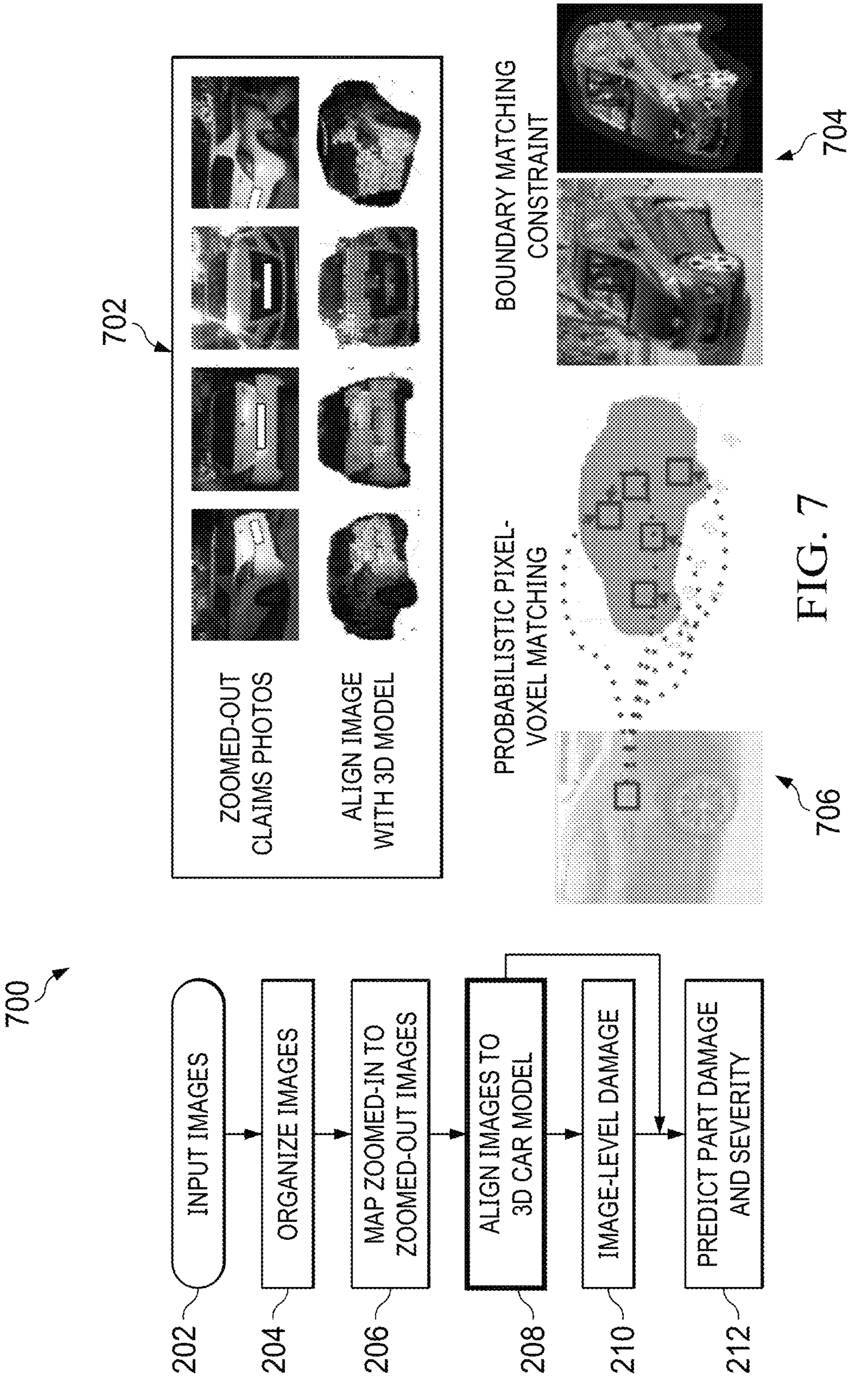
FIG. 7 illustrates a method for aligning a mapped image set onto a 3D vehicle model, according to an implementation of the present disclosure.

Referring to FIG. 7, FIG. 7 illustrates a method 700 for aligning a mapped image set onto a 3D vehicle model, according to an implementation of the present disclosure. Input data 702 includes the mapped image set 500 and the previously described 3D vehicle model. Mapped images are aligned onto the surface of the 3D vehicle model. Such an alignment is determined so that vehicle parts corresponding to each pixel in the image can be inferred (assuming that a part annotation for the 3D vehicle model is known).

Referring to FIG. 8, FIG. 8 illustrates a method 800 for part annotation for a 3D vehicle model, according to an implementation of the present disclosure. In some implementations, part annotation can be determined manually in an automated manner. In some implementations, automatically annotating a 3D vehicle model includes: 1) at 806, rendering the 3D vehicle model from various camera viewpoints around the vehicle (for example, rendered images 802'); 2) at 804, using a model for part-segmentation to obtain parts corresponding to the pixels of the rendered image; and 3) at 806, determining a part annotation of the voxels of the 3D vehicle model 806' using the part annotation of the rendered image and ray tracing.

Returning to FIG. 7, the Zoomed-out images 402 are first aligned, and the alignment is used to align Zoomed-in images 404. In some implementations, the key steps in the alignment process are: 1) the surface of the 3D vehicle model is discretized, and each discretized point is referred to as a voxel; 2) a high-dimensional embedding is learned to represent the voxel and the image pixels, such that a high similarity score in the embedding space yields the pixel-voxel correspondences; 3) the optimal camera pose from which the image was likely captured is determined using the pixel-voxel correspondences and other constraints, such as the alignment of the car boundary 704 (that is, the car boundary extracted from the image should match the car boundary obtained by projecting the 3D vehicle model on the image plane); and 4) mapping between the pixels and the voxels 706 (thereby, the part categories) is determined using ray tracing with the estimated camera pose. After aligning the Zoomed-out images 402, the mapping between the Zoomed-in images 404 to Zoomed-out images 402 is used to determine the alignment of the Zoomed-out images 402 to the 3D vehicle model.

Returning to FIG. 2, from 208, method 200 proceeds to 210.

At 210, image-level damaged detection is performed to indicate which parts of the vehicle are damaged.

To train a model to perform image-level damage detection, one needs to have ground truth labels about which region (pixels) of an image is damaged. However, in the described approach, available information is claim data that contains information about which parts are damaged for a set of images for each claim. To obtain pixel-level ground truth damage labels, each image is aligned to the 3D car model, part information from the 3D car model is used to annotate parts in the image, and claim data is used to identify which regions in the image are damaged.

Figure 9:
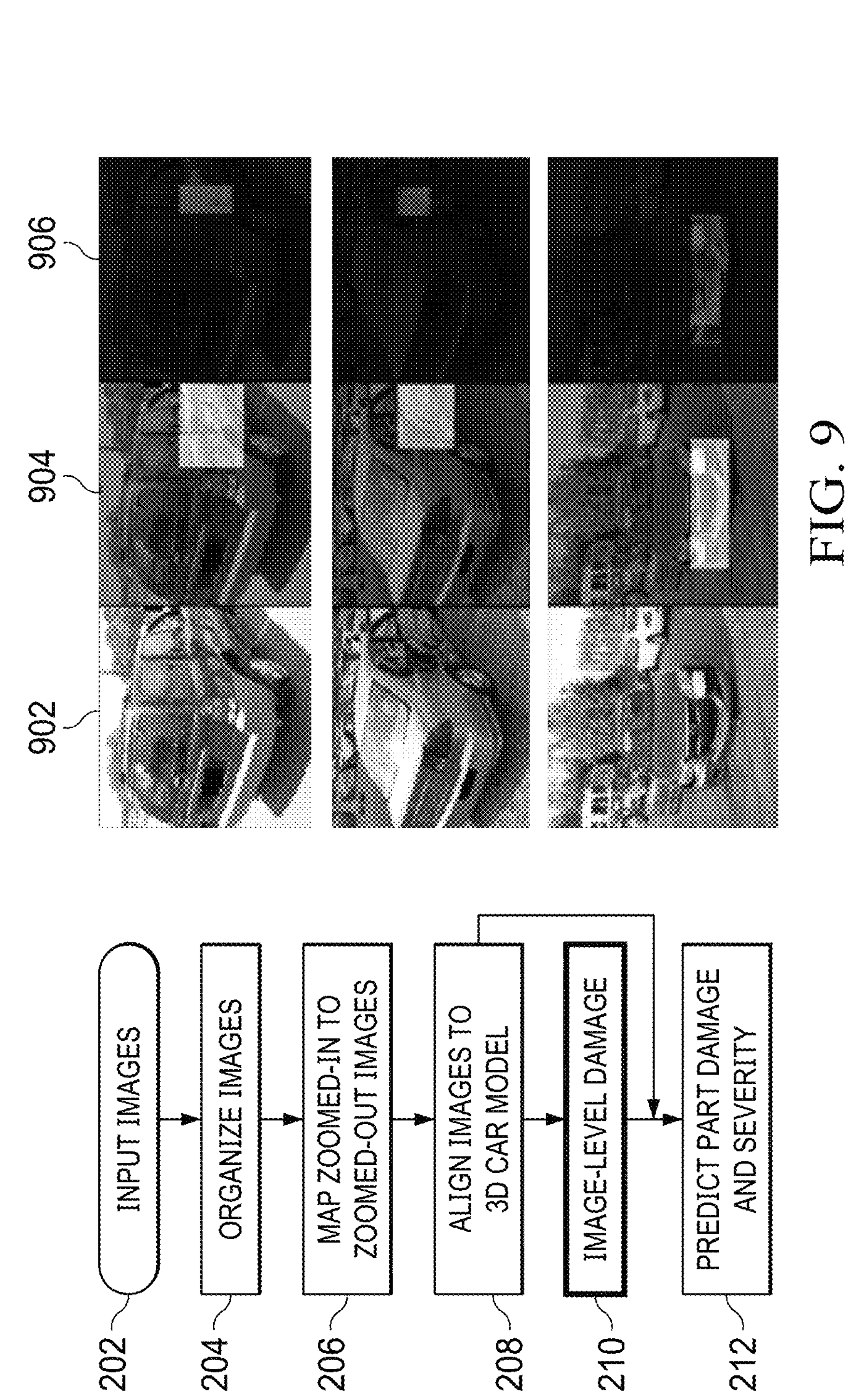
FIG. 9 illustrates image-level damage detection, according to an implementation of the present disclosure.

Referring to FIG. 9, FIG. 9 illustrates image-level damage detection 900, according to an implementation of the present disclosure. The prior alignment of an image to the 3D vehicle model in 208 yields a part correspondence for each pixel in the image. A deep neural network model is trained to estimate a damage probability for each pixel in the image using images of the damaged car and ground truth labels indicating which parts are damaged.

For example, in FIG. 9, 902 indicates an illustrative zoomed-out image in the claim set. 904 indicates a rectangular bounding box covering the damaged part of the vehicle (here, the right side vehicle door). 906 indicates the estimated damage probability for each pixel in the image.

In the case where multiple images that have a view of the same part, individual part damages predicted at the image (pixel) level are aggregated across the multiple images that have the view of the same part. This aggregation provides consistency of predicted part damages.

In some implementations, at a high-level, the deep neural network model is trained using the following key ideas: 1) an embedding function (f_theta) is learned to represent each pixel (x_i) in an image into a high-dimensional space (that contains information about the neighboring pixels), y_i=f_theta (x_i); 2) a function (g_phi) is learned to estimate a damage probability for each pixel given pixel embedding as input, p_i=g_phi (y_i); 3) functions (g_phi, f_theta) are neural networks, and their parameters are determined by minimizing a loss function that represents a fact that the estimated maximum probability over the all pixels whose parts are known to be damaged should be close to one and zero if the part is not damaged.

Returning to FIG. 2, from 210, method 200 proceeds to 212.

At 212, part damage and severity are predicted.

Figure 10:
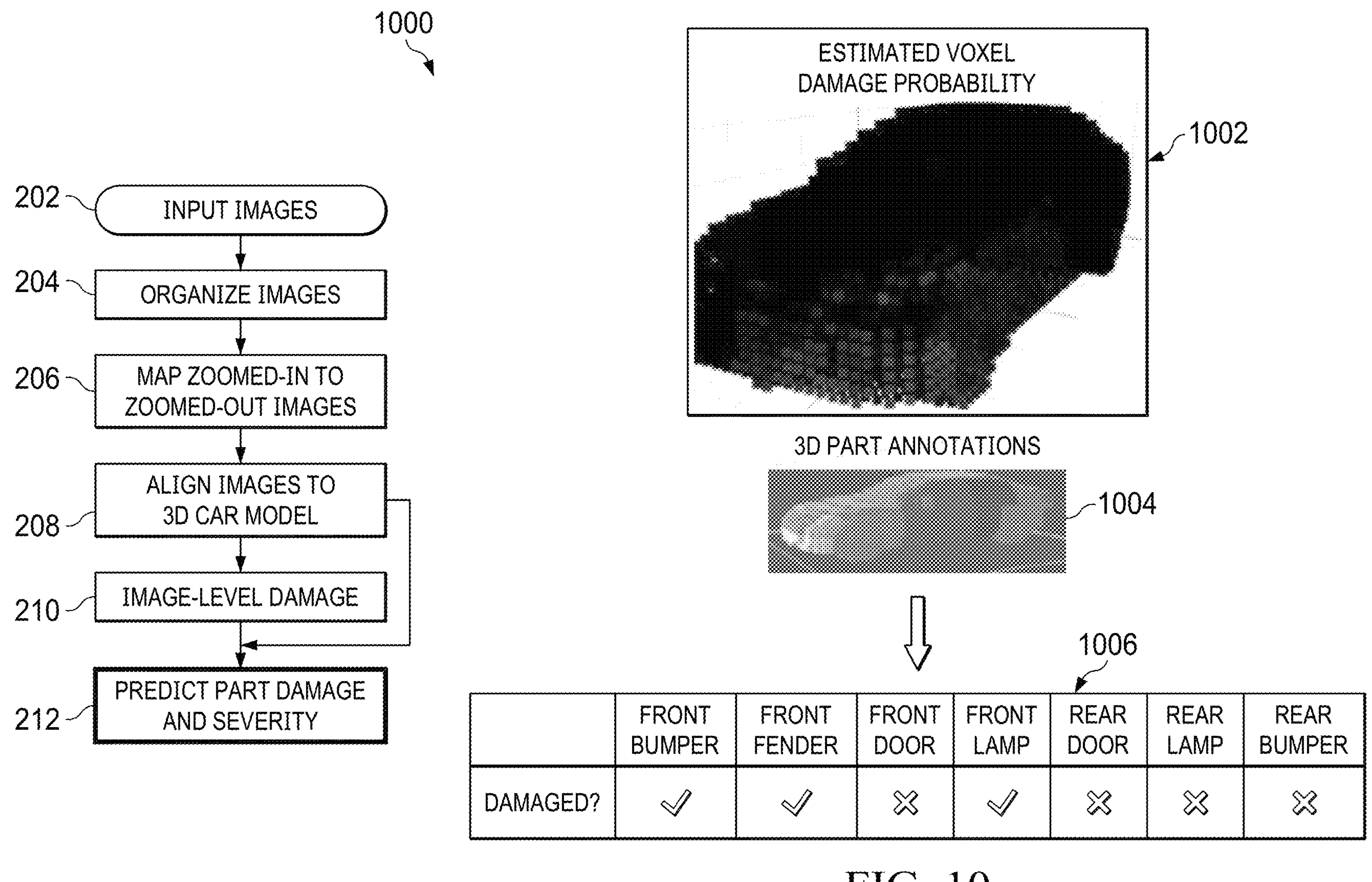
FIG. 10 illustrates a prediction of part damage and severity, according to an implementation of the present disclosure.

Referring to FIG. 10, FIG. 10 illustrates a prediction 1000 of part damage and severity, according to an implementation of the present disclosure. An image-level damage probability along with the image alignment onto the 3D vehicle model is used to estimate the damage probability 1002 of each voxel on the surface of the 3D vehicle model (in essence equivalent to painting damage probabilities onto the surface of the 3D vehicle model, which provides a 3D view of the damage severity of the vehicle). Part-level damage 1006 is estimated using the damage probability estimates 1002 along with the part annotation 1004 of the 3D vehicle model. If a maximum damage probability of the voxels corresponding to a particular part type, exceeds a predefined threshold, the particular part is estimated to be damaged.

Returning to FIG. 2, after 212, method 200 can stop.

In some implementations, the described approach can be leveraged to perform automatic total loss detection. For example, using the captured claim photos, a situation when the vehicle is significantly damaged so that repair cost exceeds the insurance value can be detected (that is, a total loss). The ability to detect total loss at the scene of an accident is of immense value to insurers (for example, because it cuts down vehicle storage costs, inspection costs, towing charges, and enables faster claims processing). The described approach provides 3D damage severity (refer to 212 and FIG. 10) which can be used to predict quickly if a total loss has occurred.

In some implementations, generative AI, metadata, and sensor-based vehicle telematics data related to an accident can be leveraged for part damage estimation as well as total loss prediction. For example, the previously described alignment and prediction processes (e.g., refer to FIGS. 7-10 and associated description) provide a mechanism to embed image data (e.g., 2D images) into a higher-dimensional latent space, which is then used to determine the 3D damage severity of the vehicle.

Metadata that may be available can include vehicle make, vehicle retail value, model, year, mileage, accident report, and police report. The metadata is converted, if necessary, into a textual or other format. The sensor-based vehicle telematics data can include turn rate, speed, direction, braking, acceleration, temperature, humidity, lighting, and other data. The sensor-based vehicle telematics data is converted, if necessary, into a textual or other format that includes embedding the data into higher dimensional latent space.

The metadata and vehicle telematics data can be incorporated into custom-trained, multi-modal large language models (LLMs). The LLMs can be used to embed text, images, and sensor data into a common latent space. The LLMs can then be used to generate predictions of part damages. In some implementations, the use of the LLMs can replace some or all functionality described in FIGS. 9-10 or be used to enhance one or more aspects of the functionality described in FIGS. 9-10 to generate predictions of part damages as well as total loss determinations.

In some implementations, and at a lower level, a transformer architecture is utilized to embed data into a higher dimensional space. Image data is embedded using a vision transformer, sensor data is embedded using a custom time-series transformer, and text is embedded using open source LLM models. Further, one can include other relevant information, such as 2D or 3D vehicle part segmentation (or other relevant data), which can be similarly embedded in a higher dimensional latent space. The embedding from different modalities can then be combined as inputs to the custom multimodal LLM to generate predictions of part damages as well as total loss probability.

Figure 11:
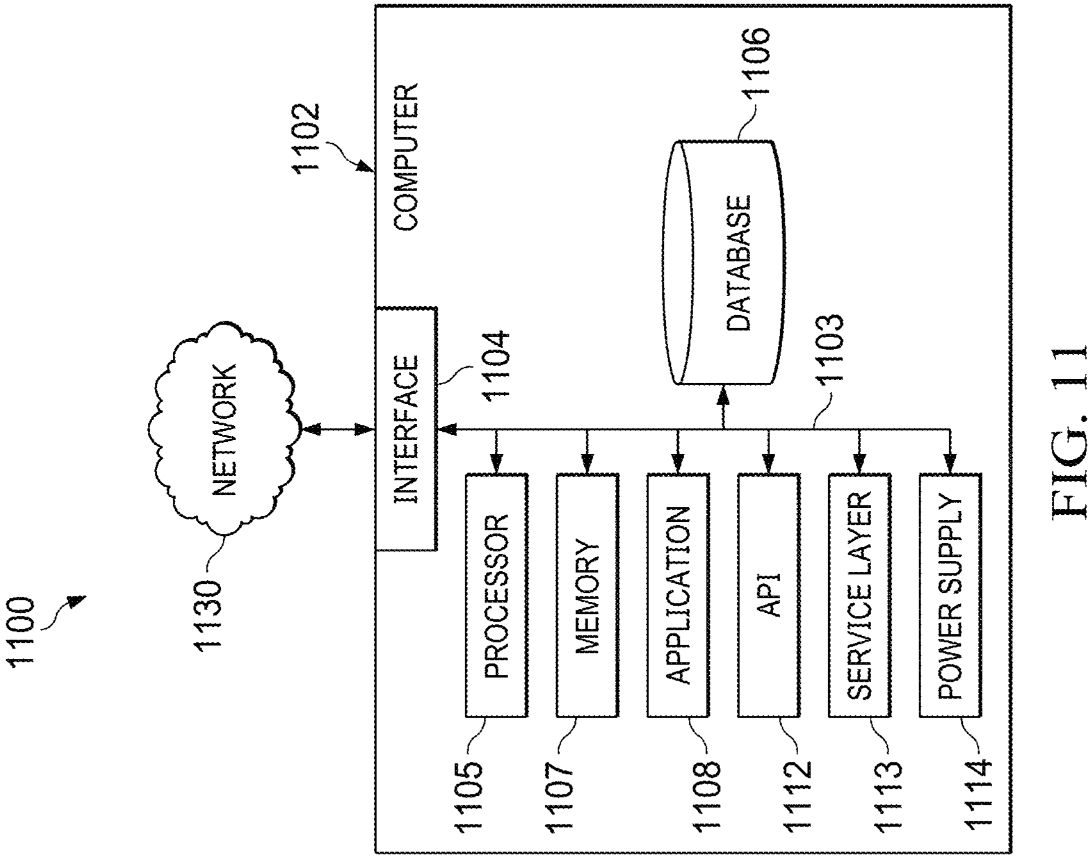
FIG. 11 is a block diagram illustrating an example of a computer-implemented system used to provide computational functionalities associated with described algorithms, methods, functions, processes, flows, and procedures, according to an implementation of the present disclosure.

FIG. 11 is a block diagram illustrating an example of a computer-implemented System 1100 used to provide computational functionalities associated with described algorithms, methods, functions, processes, flows, and procedures, according to an implementation of the present disclosure. In the illustrated implementation, System 1100 includes a Computer 1102 and a Network 1130 (for example, network 108 of FIG. 1).

The illustrated Computer 1102 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the Computer 1102 can include an input device, such as a keypad, keyboard, or touch screen, or a combination of input devices that can accept user information, and an output device that conveys information associated with the operation of the Computer 1102, including digital data, visual, audio, another type of information, or a combination of types of information, on a graphical-type user interface (UI) (or GUI) or other UI.

The Computer 1102 can serve in a role in a distributed computing system as, for example, a client, network component, a server, or a database or another persistency, or a combination of roles for performing the subject matter described in the present disclosure. The illustrated Computer 1102 is communicably coupled with a Network 1130. In some implementations, one or more components of the Computer 1102 can be configured to operate within an environment, or a combination of environments, including cloud-computing, local, or global.

At a high level, the Computer 1102 is an electronic computing device operable to receive, transmit, process, store, or manage data and information associated with the described subject matter. According to some implementations, the Computer 1102 can also include or be communicably coupled with a server, such as an application server, e-mail server, web server, caching server, or streaming data server, or a combination of servers.

The Computer 1102 can receive requests over Network 1130 (for example, from a client software application executing on another Computer 1102) and respond to the received requests by processing the received requests using a software application or a combination of software applications. In addition, requests can also be sent to the Computer 1102 from internal users (for example, from a command console or by another internal access method), external or third-parties, or other entities, individuals, systems, or computers.

Each of the components of the Computer 1102 can communicate using a System Bus 1103. In some implementations, any, or all of the components of the Computer 1102, including hardware, software, or a combination of hardware and software, can interface over the System Bus 1103 using an application programming interface (API) 1112, a Service Layer 1113, or a combination of the API 1112 and Service Layer 1113. The API 1112 can include specifications for routines, data structures, and object classes. The API 1112 can be either computer-language independent or dependent and refer to a complete interface, a single function, or even a set of APIs. The Service Layer 1113 provides software services to the Computer 1102 or other components (whether illustrated or not) that are communicably coupled to the Computer 1102. The functionality of the Computer 1102 can be accessible for all service consumers using the Service Layer 1113. Software services, such as those provided by the Service Layer 1113, provide reusable, defined functionalities through a defined interface. For example, the interface can be software written in a computing language (for example JAVA or C++) or a combination of computing languages, and providing data in a particular format (for example, extensible markup language (XML)) or a combination of formats. While illustrated as an integrated component of the Computer 1102, alternative implementations can illustrate the API 1112 or the Service Layer 1113 as stand-alone components in relation to other components of the Computer 1102 or other components (whether illustrated or not) that are communicably coupled to the Computer 1102. Moreover, any or all parts of the API 1112 or the Service Layer 1113 can be implemented as a child or a sub-module of another software module, enterprise application, or hardware module without departing from the scope of the present disclosure.

The Computer 1102 includes an Interface 1104. Although illustrated as a single Interface 1104, two or more Interfaces 1104 can be used according to particular needs, desires, or particular implementations of the Computer 1102. The Interface 1104 is used by the Computer 1102 for communicating with another computing system (whether illustrated or not) that is communicatively linked to the Network 1130 in a distributed environment. Generally, the Interface 1104 is operable to communicate with the Network 1130 and includes logic encoded in software, hardware, or a combination of software and hardware. More specifically, the Interface 1104 can include software supporting one or more communication protocols associated with communications such that the Network 1130 or hardware of Interface 1104 is operable to communicate physical signals within and outside of the illustrated Computer 1102.

The Computer 1102 includes a Processor 1105. Although illustrated as a single Processor 1105, two or more Processors 1105 can be used according to particular needs, desires, or particular implementations of the Computer 1102. Generally, the Processor 1105 executes instructions and manipulates data to perform the operations of the Computer 1102 and any algorithms, methods, functions, processes, flows, and procedures as described in the present disclosure.

The Computer 1102 also includes a Database 1106 that can hold data for the Computer 1102, another component communicatively linked to the Network 1130 (whether illustrated or not), or a combination of the Computer 1102 and another component. For example, Database 1106 can be an in-memory or conventional database storing data consistent with the present disclosure. In some implementations, Database 1106 can be a combination of two or more different database types (for example, a hybrid in-memory and conventional database) according to particular needs, desires, or particular implementations of the Computer 1102 and the described functionality. Although illustrated as a single Database 1106, two or more databases of similar or differing types can be used according to particular needs, desires, or particular implementations of the Computer 1102 and the described functionality. While Database 1106 is illustrated as an integral component of the Computer 1102, in alternative implementations, Database 1106 can be external to the Computer 1102. The Database 1106 can hold and operate on at least any data type mentioned or any data type consistent with this disclosure.

The Computer 1102 also includes a Memory 1107 that can hold data for the Computer 1102, another component or components communicatively linked to the Network 1130 (whether illustrated or not), or a combination of the Computer 1102 and another component. Memory 1107 can store any data consistent with the present disclosure. In some implementations, Memory 1107 can be a combination of two or more different types of memory (for example, a combination of semiconductor and magnetic storage) according to particular needs, desires, or particular implementations of the Computer 1102 and the described functionality. Although illustrated as a single Memory 1107, two or more Memories 1107 or similar or differing types can be used according to particular needs, desires, or particular implementations of the Computer 1102 and the described functionality. While Memory 1107 is illustrated as an integral component of the Computer 1102, in alternative implementations, Memory 1107 can be external to the Computer 1102.

The Application 1108 is an algorithmic software engine providing functionality according to particular needs, desires, or particular implementations of the Computer 1102, particularly with respect to functionality described in the present disclosure. For example, Application 1108 can serve as one or more components, modules, or applications. Further, although illustrated as a single Application 1108, the Application 1108 can be implemented as multiple Applications 1108 on the Computer 1102. In addition, although illustrated as integral to the Computer 1102, in alternative implementations, the Application 1108 can be external to the Computer 1102.

The Computer 1102 can also include a Power Supply 1114. The Power Supply 1114 can include a rechargeable or non-rechargeable battery that can be configured to be either user- or non-user-replaceable. In some implementations, the Power Supply 1114 can include power-conversion or management circuits (including recharging, standby, or another power management functionality). In some implementations, the Power Supply 1114 can include a power plug to allow the Computer 1102 to be plugged into a wall socket or another power source to, for example, power the Computer 1102 or recharge a rechargeable battery.

There can be any number of Computers 1102 associated with, or external to, a computer system containing Computer 1102, each Computer 1102 communicating over Network 1130. Further, the term "client," "user," or other appropriate terminology can be used interchangeably, as appropriate, without departing from the scope of the present disclosure. Moreover, the present disclosure contemplates that many users can use one Computer 1102, or that one user can use multiple computers 1102.

Described implementations of the subject matter can include one or more features, alone or in combination.

For example, in a first implementation, a computer-implemented method, comprising: capturing, as a captured set of images, a set of images of a vehicle, wherein the set of images are captured from different viewpoints around the vehicle; organizing the captured set of images; mapping, as a mapped image set, the captured set of images using an image classification model; aligning, as an aligned image set, the mapped image set onto a three-dimensional vehicle model for the vehicle; performing image-level damage detection on each image in the aligned image set to estimate a damage probability for each pixel in each image; and predicting part damage and severity for each image.

The foregoing and other described implementations can each, optionally, include one or more of the following features:

A first feature, combinable with any of the following features, wherein each image of the captures set of images is automatically categorized into one of three categories: 1) Zoomed-out; 2) Zoomed-in; and 3) Other.

A second feature, combinable with any of the previous or following features, wherein each Zoomed-in image is mapped to a determined best matching Zoomed-out image using an image warping transformation.

A third feature, combinable with any of the previous or following features, wherein the aligning the mapped image set onto a three-dimensional vehicle model for the vehicle, comprises: discretizing a surface of the three-dimensional vehicle model, wherein each discretized point is referred to as a voxel; learning a high-dimensional embedding to represent each voxel and each image pixel, wherein a high similarity score in an embedding space yields a pixel-voxel correspondence; determining an optimal camera pose using at least the pixel-voxel correspondence; and determining a mapping between each image pixel and each voxel using ray tracing with the optimal camera pose.

A fourth feature, combinable with any of the previous or following features, wherein aligning, as an aligned image set, the mapped image set onto a three-dimensional vehicle model for the vehicle yields a part correspondence for each pixel in each image of the aligned image set and a deep neural network model is trained to estimate the damage probability for each pixel in each image.

A fifth feature, combinable with any of the previous or following features, wherein predicting part damage and severity for each image comprises estimating damage of a part using the damage probability and a part annotation.

A sixth feature, combinable with any of the previous or following features, wherein the part annotation comprises: rendering, as rendered images, the three-dimensional vehicle model from different viewpoints around the vehicle; using a model for part-segmentation to obtain parts corresponding to pixels of the three-dimensional vehicle model; and determining a part annotation of voxels of the three-dimensional vehicle model using the parts corresponding to each pixel of each rendered image of the rendered images and ray tracing.

In a second implementation, a non-transitory, computer-readable medium storing one or more instructions executable by a computer system to perform operations, comprising: capturing, as a captured set of images, a set of images of a vehicle, wherein the set of images are captured from different viewpoints around the vehicle; organizing the captured set of images; mapping, as a mapped image set, the captured set of images using an image classification model; aligning, as an aligned image set, the mapped image set onto a three-dimensional vehicle model for the vehicle; performing image-level damage detection on each image in the aligned image set to estimate a damage probability for each pixel in each image; and predicting part damage and severity for each image.

The foregoing and other described implementations can each, optionally, include one or more of the following features:

A first feature, combinable with any of the following features, wherein each image of the captures set of images is automatically categorized into one of three categories: 1) Zoomed-out; 2) Zoomed-in; and 3) Other.

A second feature, combinable with any of the previous or following features, wherein each Zoomed-in image is mapped to a determined best matching Zoomed-out image using an image warping transformation.

A third feature, combinable with any of the previous or following features, wherein the aligning the mapped image set onto a three-dimensional vehicle model for the vehicle, comprises: discretizing a surface of the three-dimensional vehicle model, wherein each discretized point is referred to as a voxel; learning a high-dimensional embedding to represent each voxel and each image pixel, wherein a high similarity score in an embedding space yields a pixel-voxel correspondence; determining an optimal camera pose using at least the pixel-voxel correspondence; and determining a mapping between each image pixel and each voxel using ray tracing with the optimal camera pose.

A fourth feature, combinable with any of the previous or following features, wherein aligning, as an aligned image set, the mapped image set onto a three-dimensional vehicle model for the vehicle yields a part correspondence for each pixel in each image of the aligned image set and a deep neural network model is trained to estimate the damage probability for each pixel in each image.

A fifth feature, combinable with any of the previous or following features, wherein predicting part damage and severity for each image comprises estimating damage of a part using the damage probability and a part annotation.

A sixth feature, combinable with any of the previous or following features, wherein the part annotation comprises: rendering, as rendered images, the three-dimensional vehicle model from different viewpoints around the vehicle; using a model for part-segmentation to obtain parts corresponding to pixels of the three-dimensional vehicle model; and determining a part annotation of voxels of the three-dimensional vehicle model using the parts corresponding to each pixel of each rendered image of the rendered images and ray tracing.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations, comprising: capturing, as a captured set of images, a set of images of a vehicle, wherein the set of images are captured from different viewpoints around the vehicle; organizing the captured set of images; mapping, as a mapped image set, the captured set of images using an image classification model; aligning, as an aligned image set, the mapped image set onto a three-dimensional vehicle model for the vehicle; performing image-level damage detection on each image in the aligned image set to estimate a damage probability for each pixel in each image; and predicting part damage and severity for each image.

The foregoing and other described implementations can each, optionally, include one or more of the following features:

A first feature, combinable with any of the following features, wherein each image of the captures set of images is automatically categorized into one of three categories: 1) Zoomed-out; 2) Zoomed-in; and 3) Other.

A second feature, combinable with any of the previous or following features, wherein each Zoomed-in image is mapped to a determined best matching Zoomed-out image using an image warping transformation.

A third feature, combinable with any of the previous or following features, wherein the aligning the mapped image set onto a three-dimensional vehicle model for the vehicle, comprises: discretizing a surface of the three-dimensional vehicle model, wherein each discretized point is referred to as a voxel; learning a high-dimensional embedding to represent each voxel and each image pixel, wherein a high similarity score in an embedding space yields a pixel-voxel correspondence; determining an optimal camera pose using at least the pixel-voxel correspondence; and determining a mapping between each image pixel and each voxel using ray tracing with the optimal camera pose.

A fourth feature, combinable with any of the previous or following features, wherein aligning, as an aligned image set, the mapped image set onto a three-dimensional vehicle model for the vehicle yields a part correspondence for each pixel in each image of the aligned image set and a deep neural network model is trained to estimate the damage probability for each pixel in each image.

A fifth feature, combinable with any of the previous or following features, wherein predicting part damage and severity for each image comprises estimating damage of a part using the damage probability and a part annotation.

A sixth feature, combinable with any of the previous or following features, wherein the part annotation comprises: rendering, as rendered images, the three-dimensional vehicle model from different viewpoints around the vehicle; using a model for part-segmentation to obtain parts corresponding to pixels of the three-dimensional vehicle model; and determining a part annotation of voxels of the three-dimensional vehicle model using the parts corresponding to each pixel of each rendered image of the rendered images and ray tracing.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed. The computer storage medium is not, however, a propagated signal.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second(s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," "computing device," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field-programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device, for example, a universal serial bus (USB) flash drive, to name just a few.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security, or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface (GUI) can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11x or other protocols, all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

The separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:

capturing, as a captured set of images, a set of images of a vehicle, wherein the set of images are captured from different viewpoints around the vehicle;

organizing the captured set of images into a first category and a second category using an image classification model, such that a first subset of the captured set of images is assigned to the first category and a second subset of the captured set of images is assigned to the second category;

mapping, as a mapped image set, the first subset of the captured set of images to the second subset of the captured set of images;

aligning, as an aligned image set, the mapped image set onto a three-dimensional vehicle model for the vehicle;

performing image-level damage detection on each image in the aligned image set at least in part by estimating a damage probability for each pixel in each image; and predicting part damage and severity for each image.

2. The computer-implemented method of claim 1, wherein the first and second categories include: 1) Zoomed-out; and 2) Zoomed-in.

3. The computer-implemented method of claim 2, wherein each Zoomed-in image is mapped to a determined best matching Zoomed-out image using an image warping transformation.

4. The computer-implemented method of claim 1, wherein the aligning the mapped image set onto a three-dimensional vehicle model for the vehicle, comprises:

discretizing a surface of the three-dimensional vehicle model, wherein each discretized point is referred to as a voxel;

learning a high-dimensional embedding to represent each voxel and each image pixel, wherein a high similarity score in an embedding space yields a pixel-voxel correspondence;

determining an optimal camera pose using at least the pixel-voxel correspondence; and determining a mapping between each image pixel and each voxel using ray tracing with the optimal camera pose.

5. The computer-implemented method of claim 1, wherein aligning, as an aligned image set, the mapped image set onto a three-dimensional vehicle model for the vehicle yields a part correspondence for each pixel in each image of the aligned image set, and wherein a deep neural network model is trained to estimate the damage probability for each pixel in each image.

6. The computer-implemented method of claim 5, wherein predicting part damage and severity for each image comprises estimating damage of a part using the damage probability and a part annotation.

7. The computer-implemented method of claim 6, wherein the part annotation comprises:

rendering, as rendered images, the three-dimensional vehicle model from different viewpoints around the vehicle;

using a model for part-segmentation to obtain parts corresponding to pixels of the three-dimensional vehicle model; and determining a part annotation of voxels of the three-dimensional vehicle model using the parts corresponding to each pixel of each rendered image of the rendered images and ray tracing.

8. A non-transitory, computer-readable medium storing one or more instructions executable by a computer system to perform operations, comprising:

capturing, as a captured set of images, a set of images of a vehicle, wherein the set of images are captured from different viewpoints around the vehicle;

organizing the captured set of images into a first category and a second category using an image classification model, such that a first subset of the captured set of images is assigned to the first category and a second subset of the captured set of images is assigned to the second category;

mapping, as a mapped image set, the first subset of the captured set of images to the second subset of the captured set of images aligning, as an aligned image set, the mapped image set onto a three-dimensional vehicle model for the vehicle;

performing image-level damage detection on each image in the aligned image set at least in part by estimating a damage probability for each pixel in each image; and predicting part damage and severity for each image.

9. The non-transitory, computer-readable medium of claim 8, wherein the first and second categories include: 1) Zoomed-out; and 2) Zoomed-in.

10. The non-transitory, computer-readable medium of claim 9, wherein each Zoomed-in image is mapped to a determined best matching Zoomed-out image using an image warping transformation.

11. The non-transitory, computer-readable medium of claim 8, wherein the aligning the mapped image set onto a three-dimensional vehicle model for the vehicle, comprises:

discretizing a surface of the three-dimensional vehicle model, wherein each discretized point is referred to as a voxel;

learning a high-dimensional embedding to represent each voxel and each image pixel, wherein a high similarity score in an embedding space yields a pixel-voxel correspondence;

determining an optimal camera pose using at least the pixel-voxel correspondence; and determining a mapping between each image pixel and each voxel using ray tracing with the optimal camera pose.

12. The non-transitory, computer-readable medium of claim 8, wherein aligning, as an aligned image set, the mapped image set onto a three-dimensional vehicle model for the vehicle yields a part correspondence for each pixel in each image of the aligned image set, and wherein a deep neural network model is trained to estimate the damage probability for each pixel in each image.

13. The non-transitory, computer-readable medium of claim 12, wherein predicting part damage and severity for each image comprises estimating damage of a part using the damage probability and a part annotation.

14. The non-transitory, computer-readable medium of claim 13, wherein the part annotation comprises:

rendering, as rendered images, the three-dimensional vehicle model from different viewpoints around the vehicle;

using a model for part-segmentation to obtain parts corresponding to pixels of the three-dimensional vehicle model; and determining a part annotation of voxels of the three-dimensional vehicle model using the parts corresponding to each pixel of each rendered image of the rendered images and ray tracing.

15. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations, comprising:

capturing, as a captured set of images, a set of images of a vehicle, wherein the set of images are captured from different viewpoints around the vehicle;

organizing the captured set of images into a first category and a second category using an image classification model, such that a first subset of the captured set of images is assigned to the first category and a second subset of the captured set of images is assigned to the second category;

mapping, as a mapped image set, the first subset of the captured set of images to the second subset of the captured set of images aligning, as an aligned image set, the mapped image set onto a three-dimensional vehicle model for the vehicle;

performing image-level damage detection on each image in the aligned image set at least in part by estimating a damage probability for each pixel in each image; and predicting part damage and severity for each image.

16. The computer-implemented system of claim 15, wherein the first and second categories include: 1) Zoomed-out; and 2) Zoomed-in.

17. The computer-implemented system of claim 16, wherein each Zoomed-in image is mapped to a determined best matching Zoomed-out image using an image warping transformation.

18. The computer-implemented system of claim 15, wherein the aligning the mapped image set onto a three-dimensional vehicle model for the vehicle, comprises:

discretizing a surface of the three-dimensional vehicle model, wherein each discretized point is referred to as a voxel;

learning a high-dimensional embedding to represent each voxel and each image pixel, wherein a high similarity score in an embedding space yields a pixel-voxel correspondence;

determining an optimal camera pose using at least the pixel-voxel correspondence; and determining a mapping between each image pixel and each voxel using ray tracing with the optimal camera pose.

19. The computer-implemented system of claim 15, wherein aligning, as an aligned image set, the mapped image set onto a three-dimensional vehicle model for the vehicle yields a part correspondence for each pixel in each image of the aligned image set, and wherein a deep neural network model is trained to estimate the damage probability for each pixel in each image.

20. The computer-implemented system of claim 19, wherein predicting part damage and severity for each image comprises estimating damage of a part using the damage probability and a part annotation.

* * * * *